(12) United States Patent
Liu et al.

(10) Patent No.: US 10,924,856 B2
(45) Date of Patent: Feb. 16, 2021

(54) TOUCH BLUETOOTH HEADSET

(71) Applicant: SHENZHEN GRANDSUN ELECTRONIC CO., LTD., Guangdong (CN)

(72) Inventors: Xi Liu, Guangdong (CN); Xianzhuo Qin, Guangdong (CN); Xinlong Peng, Guangdong (CN); Haiquan Wu, Guangdong (CN); Ruiwen Shi, Guangdong (CN)

(73) Assignee: SHENZHEN GRANDSUN ELECTRONIC CO., LTD., Shenzhen (CN)

( * ) Notice: Subject to any disclaimer, the term of this patent is extended or adjusted under 35 U.S.C. 154(b) by 74 days.

(21) Appl. No.: 16/462,896

(22) PCT Filed: Mar. 24, 2017

(86) PCT No.: PCT/CN2017/078178
§ 371 (c)(1),
(2) Date: May 21, 2019

(87) PCT Pub. No.: WO2018/018907
PCT Pub. Date: Feb. 1, 2018

(65) Prior Publication Data
US 2019/0320265 A1   Oct. 17, 2019

(30) Foreign Application Priority Data

Jul. 26, 2016   (CN) .......................... 201610597206.6

(51) Int. Cl.
*H04R 5/033* (2006.01)
*H04W 4/80* (2018.01)
(Continued)

(52) U.S. Cl.
CPC ......... *H04R 5/033* (2013.01); *G06F 3/03547* (2013.01); *H04R 1/1041* (2013.01); *H04W 4/80* (2018.02); *H04R 2420/07* (2013.01)

(58) Field of Classification Search
CPC ...... H04R 5/033; H04R 5/0335; H04R 1/105; H04R 1/1075; H04R 1/1041; H04R 2420/07
(Continued)

(56) References Cited

U.S. PATENT DOCUMENTS

2007/0079206 A1*   4/2007   Arora ...................... G06F 3/038
                                                            714/745
2016/0050474 A1*   2/2016   Rye .......................... H05K 7/08
                                                            381/152
(Continued)

FOREIGN PATENT DOCUMENTS

CN    102331871    1/2012
CN    103336559    10/2013
(Continued)

OTHER PUBLICATIONS

SIPO, International Search Report for PCT/CN2017/078178 dated Jun. 22, 2017 with English translation.

*Primary Examiner* — Disler Paul
(74) *Attorney, Agent, or Firm* — Fish & Richardson P.C.

(57) ABSTRACT

A touch Bluetooth headset includes a housing, a touchpad, a main board, a Bluetooth antenna, a first thimble and a second thimble. The touchpad is a flexible touchpad, the main board and the touchpad are opposite and fixed on the housing, and the touchpad is provided with a plurality of metal contacts. The first thimble and the second thimble have one end fixed to the main board and other end extending toward the touchpad and abutting against the metal contacts. The Bluetooth antenna is laid on the touchpad and connected to the metal contacts. The touch Bluetooth head-
(Continued)

set may be designed to be more miniaturized; additionally, an additional Bluetooth antenna is added in the touchpad and the Bluetooth antenna is jacked up by the above thimbles, which reduces the electromagnetic shielding, thereby the micro Bluetooth headset has a better signal transmission distance.

19 Claims, 2 Drawing Sheets

(51) Int. Cl.
  *G06F 3/0354* (2013.01)
  *H04R 1/10* (2006.01)
(58) Field of Classification Search
  USPC ................................. 381/77, 87, 79, 74, 334
  See application file for complete search history.

(56) References Cited

U.S. PATENT DOCUMENTS

| | | | | |
|---|---|---|---|---|
| 2016/0309246 | A1* | 10/2016 | O'Keeffe | H04W 4/70 |
| 2017/0199643 | A1* | 7/2017 | Schnyder | H04R 25/558 |

FOREIGN PATENT DOCUMENTS

| | | |
|---|---|---|
| CN | 204103026 | 1/2015 |
| CN | 105389046 | 3/2016 |
| CN | 205160752 | 4/2016 |
| CN | 106060698 | 10/2016 |
| CN | 205987273 | 2/2017 |

* cited by examiner

TOUCH BLUETOOTH HEADSET

CROSS-REFERENCE TO RELATED APPLICATIONS

This application is a U.S. National Phase application under 35 U.S.C. § 371 of International Patent Application No. PCT/CN2017/078178, filed Mar. 24, 2017, which claims priority to Chinese Application No. 201610597206.6, filed Jul. 26, 2016. The entire contents of the parent applications are hereby incorporated by reference.

TECHNICAL FIELD

The present application pertains to the technical field of headsets, and in particularly to a touch Bluetooth headset.

BACKGROUND

With the development of electronic industries, the electronic devices with Bluetooth function, such as a mobile phone, a tablet computer and an in-vehicle device and the like, have been widely used in people's daily life. During the use of the above electronic products, Bluetooth headsets have become a very important auxiliary device and are applied very commonly.

The Bluetooth headsets are loved by many users for its light weight and compact size. However, on the present market, it is difficult to ensure that the Bluetooth headsets have a longer signal transmission distance under the premise of ensuring that the Bluetooth headsets with touch function are miniaturized in volume, and it is difficult to ensure that the headsets have smaller size while ensure that the Bluetooth headsets have a longer transmission distance. Moreover, poor transmission distance of the headsets leads to poor user experience, and large boundary dimension of the headsets affects the appearance.

Technical Problem

The purpose of the preset application is to provide a touch Bluetooth headset, which is aimed at solving the technical problem that the touch Bluetooth headsets in the prior art are subject to poor signal transmission distance and large boundary dimension.

Solutions for the Problem

Technical Solutions

The present application is embodied as follows.
A touch Bluetooth headset, which includes:
a housing formed with an accommodation space;
a touchpad mounted in the accommodation space, wherein the touchpad is a flexible touchpad and provided with a plurality of metal contacts, and the metal contacts comprises a first metal contact electrically connected to the touchpad and a second metal contact spaced apart from and insulated from the first metal contact;
a main board fixed to a bottom of the accommodation space and arranged opposite to the touchpad;
a first pillar having one end fixed and electrically connected to the main board and the other end extending toward the touchpad and abutting against the first metal contact;
a second pillar having one end fixed and electrically connected to the main board and the other end extending toward the touchpad and abutting against the second metal contact; and
a Bluetooth antenna disposed on a surface of the touchpad and electrically connected to the second metal contact.

Further, the touchpad is divided into a vacant region configured for laying the Bluetooth antenna and provided with the second metal contact and a touch region configured for receiving an external touch operation and provided with the first metal contact.

Further, the touchpad includes a first sub-touchpad and a second sub-touchpad disposed side by side within the touch region, and the first metal contact is disposed on the second sub-touchpad.

Further, the metal contacts further include a third metal contact disposed on the second sub-touchpad and insulated from the second sub-touchpad; the Bluetooth headset further includes a wire spanning between the first sub-touchpad and the second sub-touchpad and electrically connected to the first sub-touchpad and the third metal contact, and a third pillar having one end fixed and electrically connected to the main board and the other end extending toward the second sub-touchpad and abutting against the third metal contact.

Further, the metal contacts further include a fourth metal contact disposed on the second sub-touchpad and insulated from the second sub-touchpad; the Bluetooth headset further includes an antenna reference ground laid on a bottom surface of the touch region and having one end connected to the Bluetooth antenna and the other end connected to the fourth metal contact, and a fourth pillar having one end fixed and electrically connected to the main board and the other end extending toward the touchpad and abutting against the fourth metal contact.

Further, the first metal contact, the second metal contact, the third metal contact and the fourth metal contact are protrusions extending in a direction from the touchpad toward the main board.

Further, a top of the first pillar abutting against the first metal contact is in a hemispherical shape; a top of the second pillar abutting against the second metal contact is in a hemispherical shape; a top of the third pillar abutting against the third metal contact is in a hemispherical shape; and a top of the fourth pillar abutting against the fourth metal contact is in a hemispherical shape.

Further, the Bluetooth antenna further includes a curved first antenna segment and a second antenna segment connected to the first antenna segment, the first antenna segment is laid on the vacant region along an edge in a longitudinal direction of the touchpad, and the second antenna segment is laid on the vacant region and has one end connected to the first antenna segment and the other end connected to the second metal contact.

Further, the first antenna segment is electrically connected to the antenna reference ground.

Further, the housing is a thin-walled housing capable of transmitting external pressure to the touchpad.

Beneficial Effects of the Application

Beneficial Effects

Compared with the prior art, the present application has the following technical effects: in the touch Bluetooth headset, the touchpad is arranged as a flexible touchpad to adapt to various shapes of the headset, and the flexible touchpad may be mounted closely to the inner wall of the housing of the headset, so that the touchpad takes up relatively small space inside the headset, thereby the headset may be designed to be more miniaturized. In addition, an additional Bluetooth antenna is added in the touchpad in the present application, which enhances the transmission signal of the headset. Further, the touchpad is jacked up by the pillar, so that the Bluetooth antenna is far away from the lower main board, which reduces the electromagnetic shielding, thereby the micro Bluetooth headset has a better signal transmission distance.

BRIEF DESCRIPTION OF THE DRAWINGS

Description of the Drawings

In order to more clearly illustrate the technical solutions in the embodiments of the present application, the drawings to be used in the description of the embodiments of the present application or the prior art will be briefly described below. Obviously, the drawings described below are only some embodiments of the present application, and other drawings may also be obtained without creative work according to these drawings for those of ordinary skill in the art.

Figure 1:
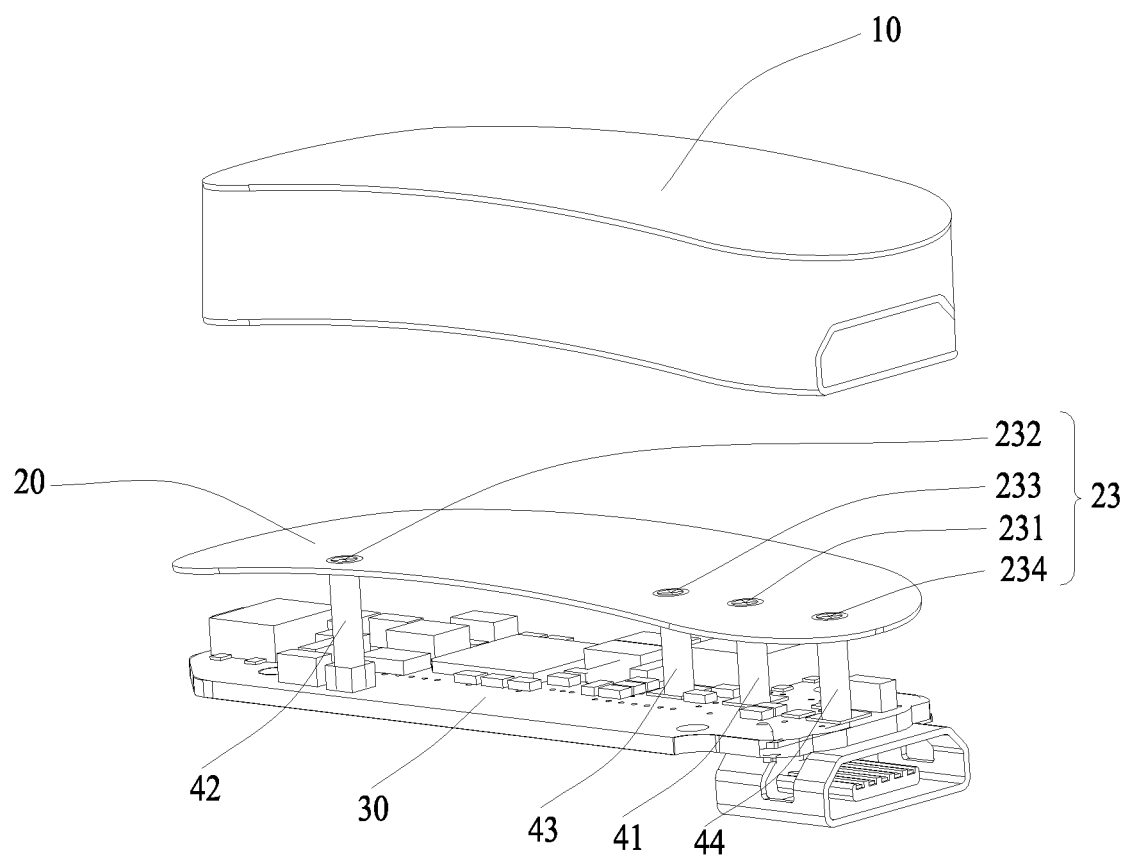

FIG. 1 is an exploded view of the touch Bluetooth headset provided by an embodiment of the present application.

Figure 2:
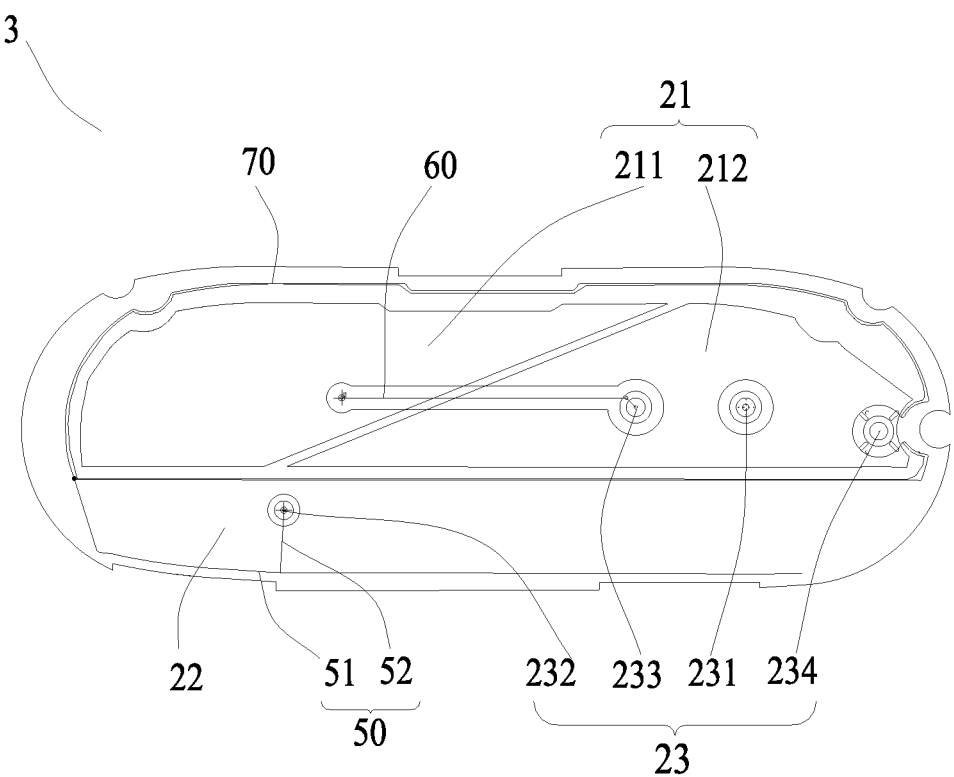

FIG. 2 is a schematic structural view of a touchpad in FIG. 1.

Figure 3:
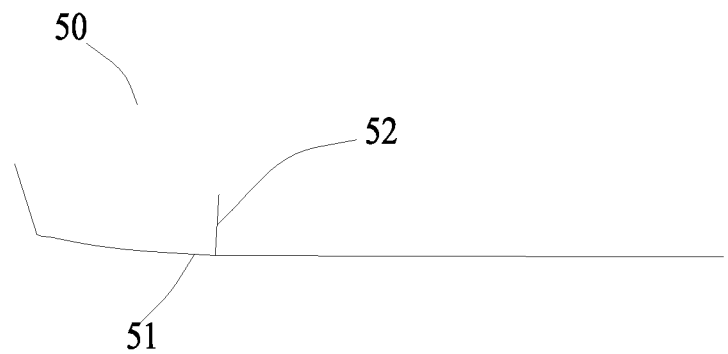

FIG. 3 is a schematic structural diagram of a Bluetooth antenna in FIG. 2.

Figure 4:
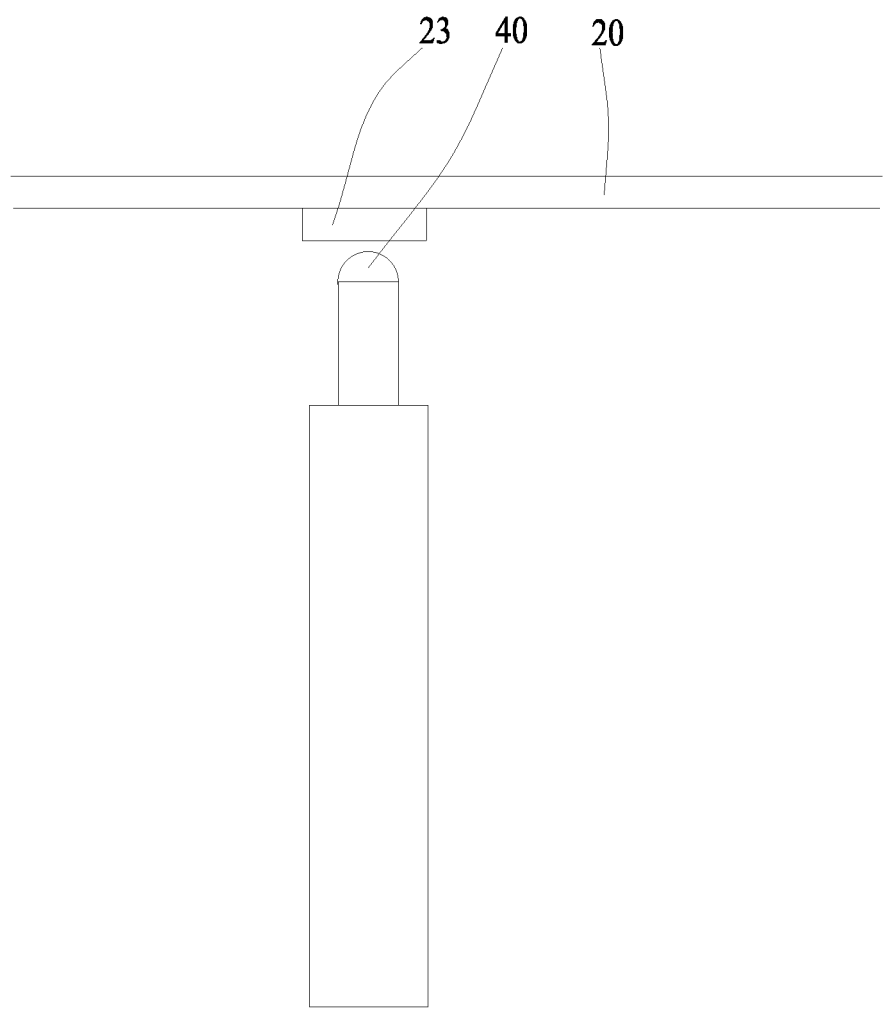

FIG. 4 is a schematic structural view showing connection between each of pillars and corresponding metal contact in FIG. 1.

Description of the reference signs:

TABLE 1

| 10  | housing            | 30 | main board             |
|-----|--------------------|----|------------------------|
| 20  | touchpad           | 41 | first pillar           |
| 21  | touch region       | 42 | second pillar          |
| 211 | first sub-touchpad | 43 | third pillar           |
| 212 | second sub-touchpad| 44 | fourth pillar          |
| 22  | vacant region      | 40 | top                    |
| 23  | metal contact      | 50 | Bluetooth antenna      |
| 231 | first metal contact| 51 | first antenna segment  |
| 232 | second metal contact| 52| second antenna segment |
| 233 | third metal contact| 60 | wire                   |
| 234 | fourth metal contact| 70| antenna reference ground|

EMBODIMENTS OF THE APPLICATION

Implementations of the Application

The embodiments of the present application are described in detail below, and the same or similar reference numerals indicate the same or similar elements, or elements having the same or similar functions herein. The embodiments described below with reference to the drawings are exemplary, which are intended to illustrate the present application and are not to be construed as limiting.

In the description of the present application, it should be understood that, the orientation or positional relationship indicated by the term such as "length", "width", "upper", "lower", "front", "back", "left", "right", "vertical", "horizontal", "top", "bottom", "inside", "outside" or the like is based on the orientation or positional relationship shown in the drawings, which is only for the convenience of describing the present application and simplifying the description, rather than indicating or implying that a specific device or element has a particular orientation, or is constructed and operated in a particular orientation, and is therefore not to be construed as limiting.

Moreover, the terms "first" and "second" are used for a descriptive purpose only, and are not to be construed as indicating or implying a relative importance or implicitly indicating the number of a specific technical feature. Thus, the feature defined with "first" and "second" may include one or more of the features either explicitly or implicitly. In the description of the present application, the meaning of "a plurality of" is two or more unless explicitly and specifically defined otherwise.

For those of ordinary skill in the art, the specific meanings of the above terms in the present application can be understood on a case-by-case basis.

In order to make the purpose, the technical solutions and advantages of the present application clearer, the present application will be further described in detail below with reference to the accompanying drawings and embodiments.

Referring to FIG. 1 and FIG. 2, the touch Bluetooth headset provided by an embodiment of the present application includes:

a housing 10 formed with an accommodation space;

a touchpad 20 mounted in the accommodation space, where, the touchpad 20 is a flexible touchpad, the touchpad 20 is provided with a plurality of metal contacts 23, and the metal contacts 23 includes a first metal contact 231 electrically connected to the touchpad 20 and a second metal contact 232 spaced apart from the first metal contact 231 and insulated from the first metal contact 231;

a main board 30 fixed to a bottom of the accommodation space and arranged opposite to the touchpad 20;

a first pillar 41 having one end fixed and electrically connected to the main board 30 and the other end extending toward the touchpad 20 and abutting against the first metal contact 231;

a second pillar 42 having one end fixed and electrically connected to the main board 30 and the other end extending toward the touchpad 20 and abutting against the second metal contact 232; and a Bluetooth antenna 50 disposed on a surface of the touchpad 20 and electrically connected to the second metal contact 232.

In the present application, the touchpad 20 is arranged as a flexible touchpad to adapt to various shapes of the headset, and the touchpad 20 may be mounted closely to the inner wall of the housing 10 of the headset with different shapes, so that the touchpad 20 takes up less space inside the headset, thereby the headset may be designed to be more miniaturized. In addition, an additional Bluetooth antenna 50 is added in the touchpad 20 in the present application, which enhances the transmission signal of the headset. Further, the touchpad 20 is jacked up by the pillar, so that the Bluetooth antenna 50 is far away from the lower main board 30, which reduces the electromagnetic shielding, thereby the micro Bluetooth headset has a better signal transmission distance.

Referring to FIG. 2, the touchpad 20 is further divided into a vacant region 22 configured for laying the Bluetooth antenna 50 and provided with the second metal contact 232 and a touch region 21 configured for receiving an external touch operation and provided with the first metal contact 231. The touch region 21 may sense the external touch operation, but the vacant region 22 is provided with no touch function. The Bluetooth antenna 50 is laid within the vacant region 22 to prevent signal interference between signals of the Bluetooth antenna 50 and the touch signals of the touch region 21. The transmission signal of the Bluetooth antenna 50 is transmitted from the main board 30 to the second pillar 42 and then to the second metal contact 232, and then transmitted via the Bluetooth antenna 50, the process of receiving signals by the Bluetooth antenna 50 is opposite to the signal transmission described above in direction.

Referring to FIG. 2, the touchpad 20 further includes a first sub-touchpad 211 and a second sub-touchpad 212 disposed side by side within the touch region 21, and the first metal contact 231 is disposed on the second sub-touchpad 212. The first sub-touchpad 211 and the second sub-touchpad 212 are two independent touch button regions, for example, a volume plus button and a volume minus button of the Bluetooth headset, or switch buttons for a previous song and a next song when the Bluetooth headset is connected to an electronic device to listen songs.

Referring to FIG. 2, the metal contacts 23 further include a third metal contact 233 disposed on the second sub-touchpad 212 and insulated from the second sub-touchpad 212. The Bluetooth headset further includes a wire 60 spanning between the first sub-touchpad 211 and the second sub-touchpad 212 and electrically connected to the first sub-touchpad 211 and the third metal contact 233; and a third pillar 43 having one end fixed and electrically connected to the main board 30 and the other end extending toward the second sub-touchpad 212 and abutting against the third metal contact 233. The touch signal of the second sub-touchpad 212 is transmitted from the first metal contact 231 to the first pillar 41 and then to the main board 30. The touch signal of the second touchpad 20 is transmitted from the wire 60 to the third metal contact 233, and then conducted from the third metal contact 233 to the third pillar 43 and then conducted to the main board 30. Since the touch signal on the first sub-touchpad 211 is finally transmitted to a position on a side of the main board 30 near the second sub-touchpad 212, that is, the position where a touch chip (not shown) is located, therefore, the third metal contact 233 is disposed on the second sub-touchpad 212 and insulated from the second sub-touchpad 212, such that the wire 60 is laid on the touchpad 20, which saves the internal space of the Bluetooth headset and facilitates miniaturized design for the Bluetooth headset.

Referring to FIG. 2, the metal contacts 23 further include a fourth metal contact 234 disposed on the second sub-touchpad 212 and insulated from the second sub-touchpad 212. The Bluetooth headset further includes an antenna reference ground 70 laid on a bottom surface of the touch region 21 and having one end connected to the Bluetooth antenna 50 and the other end connected to the fourth metal contact 234; and a fourth pillar having one end fixed and electrically connected to the main board 30 and the other end extending toward the touchpad 20 and abutting against the fourth metal contact 234. One end of the antenna reference ground 70 is connected to the Bluetooth antenna 50, and the other end of the antenna reference ground 70 is connected to the fourth metal contact 234. The fourth metal contact 234 is connected to the fourth pillar 44, the fourth pillar 44 is grounded, and the antenna reference ground 70 serves as a reference for the signal size of the Bluetooth antenna 50.

Further, the first metal contact 231, the second metal contact 232, the third metal contact 233 and the fourth metal contact 234 are protrusions extending in a direction from the touchpad 20 toward the main board 30.

It should be noted that, the main board 30 is a circuit board that implements central control.

Further, a top 40 of the first pillar 41 abutting against the first metal contact 231 is in a hemispherical shape; a top 40 of the second pillar 42 abutting against the second metal contact 232 is in a hemispherical shape; a top 40 of the third pillar 43 abutting against the third metal contact 233 is in a hemispherical shape; and a top 40 of the fourth pillar 44 abutting against the fourth metal contact 234 is in a hemispherical shape. The tops 40 of the above pillars are arranged in hemispherical shape, such that it can be ensured that good contact between the above pillars and the metal contacts 23 may always be maintained when the touchpad 20 is skewed relative to the above pillars.

Referring to FIG. 2 and FIG. 3, the Bluetooth antenna 50 further includes a curved first antenna segment 51 and a second antenna segment 52 connected to the first antenna segment 51. The first antenna segment 51 is laid on the vacant region 22 along an edge in the longitudinal direction of the touchpad 20, and the second antenna segment 52 is laid on the vacant region 22 and has one end connected to the first antenna segment 51 and the other end connected to the second metal contact 232.

Referring to FIG. 2 and FIG. 3, the first antenna segment 51 is further electrically connected to the antenna reference ground 70. The Bluetooth antenna 50 includes the first antenna segment 51 and the second antenna segment 52, and the first antenna segment 51 and the second antenna segment 52 are connected in such a manner that the Bluetooth antenna 50 is in an "inverted F" shape, thereby enhancing signal transmission and signal receiving of the Bluetooth antenna 50.

Referring to FIG. 1, the housing 10 is further a thin-walled housing capable of transmitting external pressure to the touchpad 20. The thickness at the position where the inner wall of the housing 10 contacts the touch panel 20 is relatively thin, and the user may conduct touch information to the touchpad 20 by tapping the inner wall of the housing 10, thereby reducing the arrangement for buttons on the outer surface of the housing 10, and making the design of the Bluetooth headset more concise and beautiful.

The above description is only preferred embodiments of the present application, and is not intended to limit the present application. Any modification, equivalent substitution and improvement made within the spirit and principle of the present application should be included in the protection scope of the present application.

What is claimed is:

1. A touch Bluetooth headset, comprising:
   a housing formed with an accommodation space;
   a touchpad mounted in the accommodation space, wherein the touchpad is a flexible touchpad and provided with a plurality of metal contacts, wherein the metal contacts comprises a first metal contact electrically connected to the touchpad and a second metal contact spaced apart from and insulated from the first metal contact;
   a main board fixed to a bottom of the accommodation space and arranged opposite to the touchpad;
   a first pillar having one end fixed and electrically connected to the main board and the other end extending toward the touchpad and abutting against the first metal contact;
   a second pillar having one end fixed and electrically connected to the main board and the other end extending toward the touchpad and abutting against the second metal contact; and
   a Bluetooth antenna disposed on a surface of the touchpad and electrically connected to the second metal contact;

wherein the touchpad is divided into a vacant region configured for laying the Bluetooth antenna and provided with the second metal contact and a touch region configured for receiving an external touch operation and provided with the first metal contact.

2. The touch Bluetooth headset according to claim 1, wherein through transmitting a signal from the main board to the second pillar and then to the second metal contact, the signal transmitted by the touch Bluetooth headset is transmitted via the Bluetooth antenna.

3. The touch Bluetooth headset according to claim 1, wherein the touchpad comprises a first sub-touchpad and a second sub-touchpad disposed side by side within the touch region, and the first metal contact is disposed on the second sub-touchpad.

4. The touch Bluetooth headset according to claim 3, wherein the first sub-touchpad and the second sub-touchpad are two independent touch buttons.

5. The touch Bluetooth headset according to claim 3, wherein
the metal contacts further comprise a third metal contact disposed on the second sub-touchpad and insulated from the second sub-touchpad;
the Bluetooth headset further comprises
a wire spanning between the first sub-touchpad and the second sub-touchpad and electrically connected to the first sub-touchpad and the third metal contact; and
a third pillar having one end fixed and electrically connected to the main board and the other end extending toward the second sub-touchpad and abutting against the third metal contact.

6. The touch Bluetooth headset according to claim 5, wherein a touch signal of the second sub-touchpad is transmitted from the first metal contact to the first pillar and then to the main board.

7. The touch Bluetooth headset according to claim 5, wherein a touch signal of the second touchpad is transmitted to the third metal contact by the wire, and then transmitted to the third pillar by the third metal contact and then to the main board.

8. The touch Bluetooth headset according to claim 5, wherein
the metal contacts further comprise a fourth metal contact disposed on the second sub-touchpad and insulated from the second sub-touchpad;
the Bluetooth headset further comprises
an antenna reference ground laid on a bottom surface of the touch region and having one end connected to the Bluetooth antenna and the other end connected to the fourth metal contact; and
a fourth pillar having one end fixed and electrically connected to the main board and the other end extending toward the touchpad and abutting against the fourth metal contact.

9. The touch Bluetooth headset according to claim 8, wherein the first metal contact, the second metal contact, the third metal contact and the fourth metal contact are protrusions extending in a direction from the touchpad toward the main board.

10. The touch Bluetooth headset according to claim 9, wherein the Bluetooth antenna further comprises a curved first antenna segment and a second antenna segment connected to the first antenna segment, the first antenna segment is laid on the vacant region along an edge in a longitudinal direction of the touchpad, and the second antenna segment is laid on the vacant region and has one end connected to the first antenna segment and the other end connected to the second metal contact.

11. The touch Bluetooth headset according to claim 8, wherein a top of the first pillar abutting against the first metal contact is in a hemispherical shape; a top of the second pillar abutting against the second metal contact is in a hemispherical shape; a top of the third pillar abutting against the third metal contact is in a hemispherical shape; and a top of the fourth pillar abutting against the fourth metal contact is in a hemispherical shape.

12. The touch Bluetooth headset according to claim 11, wherein the Bluetooth antenna further comprises a curved first antenna segment and a second antenna segment connected to the first antenna segment, the first antenna segment is laid on the vacant region along an edge in a longitudinal direction of the touchpad, and the second antenna segment is laid on the vacant region and has one end connected to the first antenna segment and the other end connected to the second metal contact.

13. The touch Bluetooth headset according to claim 8, wherein the Bluetooth antenna further comprises a curved first antenna segment and a second antenna segment connected to the first antenna segment, the first antenna segment is laid on the vacant region along an edge in a longitudinal direction of the touchpad, and the second antenna segment is laid on the vacant region and has one end connected to the first antenna segment and the other end connected to the second metal contact.

14. The touch Bluetooth headset according to claim 13, wherein the shape of the Bluetooth antenna is in an inverted F shape.

15. The touch Bluetooth headset according to claim 13, wherein the first antenna segment is electrically connected to the antenna reference ground.

16. The touch Bluetooth headset according to claim 15, wherein the housing is a thin-walled housing capable of transmitting external pressure to the touchpad.

17. The touch Bluetooth headset according to claim 3, wherein the first sub-touchpad and the second sub-touchpad are two independent touch button regions.

18. The touch Bluetooth headset according to claim 1, wherein the touchpad is mounted closely to an inner wall of the housing.

19. The touch Bluetooth headset according to claim 1, wherein the vacant region is provided with no touch function.

* * * * *